United States Patent
Suzuki et al.

(10) Patent No.: US 11,340,820 B2
(45) Date of Patent: May 24, 2022

(54) STORAGE SYSTEM AND DATA MIGRATION METHOD OF MIGRATING GROUP OF VOLUME AND LOGICAL RESOURCES OF THE VOLUME

(71) Applicant: Hitachi, Ltd., Tokyo (JP)

(72) Inventors: Takanobu Suzuki, Tokyo (JP); Tomohiro Kawaguchi, Tokyo (JP); Tsukasa Shibayama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 17/010,316

(22) Filed: Sep. 2, 2020

(65) Prior Publication Data

US 2021/0223977 A1 Jul. 22, 2021

(30) Foreign Application Priority Data

Jan. 21, 2020 (JP) .............................. JP2020-007261

(51) Int. Cl.
*G06F 3/06* (2006.01)

(52) U.S. Cl.
CPC ............ *G06F 3/0647* (2013.01); *G06F 3/061* (2013.01); *G06F 3/0683* (2013.01)

(58) Field of Classification Search
CPC ....... G06F 3/0647; G06F 3/061; G06F 3/0683
See application file for complete search history.

(56) References Cited

U.S. PATENT DOCUMENTS

| | | | | |
|---|---|---|---|---|
| 7,596,676 B2* | 9/2009 | Serizawa | ............... | G06F 3/0607 709/208 |
| 2012/0096192 A1* | 4/2012 | Tanaka | ................... | G06F 13/385 710/20 |
| 2013/0166872 A1* | 6/2013 | Arakawa | ............... | G06F 3/0607 711/170 |
| 2013/0326546 A1* | 12/2013 | Bavishi | ................. | G06F 16/119 719/328 |
| 2014/0372721 A1* | 12/2014 | Nakajima | ............... | G06F 3/067 711/165 |
| 2014/0380005 A1* | 12/2014 | Furuya | .................. | G06F 3/0619 711/162 |

FOREIGN PATENT DOCUMENTS

JP 2015-207277 A 11/2015

* cited by examiner

*Primary Examiner* — Chie Yew
(74) *Attorney, Agent, or Firm* — Baker Botts L.L.P.

(57) ABSTRACT

A storage-based migration is performed in a VVOL environment. A migration processing unit generates a migration group in which a virtual volume to be migrated, a protocol endpoint related to the virtual volume, and a storage container that cuts out the virtual volume are grouped, and migrates the migration group to a storage node; and a configuration changing unit configures, based on information of the migration group transmitted from the storage node, a protocol endpoint, a virtual volume, and a storage container on a storage node which are the same as the protocol endpoint, the virtual volume, and the storage container configured on the storage node.

8 Claims, 17 Drawing Sheets

| # | STORAGE CONTAINER REAL ID | STORAGE CONTAINER VIRTUAL ID | AVAILABLE CAPACITY | USED AMOUNT |
|---|---|---|---|---|
| 1 | 1 | 5 | 100TB | 30TB |
| 2 | 2 | 4 | 10TB | 2TB |
| 3 | 3 | 3 | 20TB | 4TB |
| 4 | 10 | - | 30TB | 6TB |
| 5 | 11 | - | 40TB | 8TB |

FIG. 8

| # | VOLUME REAL ID | VOLUME VIRTUAL ID | STORAGE CONTAINER REAL ID | PE/VVOL | VOLUME REAL ID OF ASSOCIATED PE | LUN | CAPACITY | MIGRATION GROUP ID | MIGRATION STATUS |
|---|---|---|---|---|---|---|---|---|---|
| 1 | 1 | 11 | 1 | PE | – | 0 | – | 1 | DURING MIGRATION |
| 2 | 2 | 12 | 1 | VVOL | 1 | 1 | 100GB | 1 | DURING MIGRATION |
| 3 | 3 | 13 | 1 | VVOL | 1 | 2 | 200GB | 1 | DURING MIGRATION |
| 4 | 4 | 14 | 2 | PE | – | 0 | – | – | – |
| 5 | 5 | 15 | 2 | VVOL | 4 | 1 | 300GB | – | – |
| 6 | 6 | 16 | 2 | VVOL | 4 | 2 | 300GB | – | – |
| 7 | 7 | 17 | 2 | VVOL | 4 | 3 | 30GB | – | – |

105

| # | MIGRATION GROUP ID | MIGRATION DESTINATION STORAGE ADDRESS | MIGRATION PE VOLUME REAL ID | MIGRATION PE VOLUME VIRTUAL ID | MIGRATION VVOL VOLUME REAL ID | MIGRATION VVOL VOLUME VIRTUAL ID | MIGRATION STORAGE CONTAINER REAL ID | MIGRATION STORAGE CONTAINER VIRTUAL ID | MIGRATION STATUS |
|---|---|---|---|---|---|---|---|---|---|
| 1 | 1 | aaa.bbb.ccc.ddd | 1 | 10 | 2,3,4 | 32, 33, 34 | 1 | 10 | DURING MIGRATION |
| 2 | 2 | eee.fff.ggg.hhh | 10 | 20 | 15, 16, 17 | 25, 26, 27 | 10 | 40 | MIGRATED |

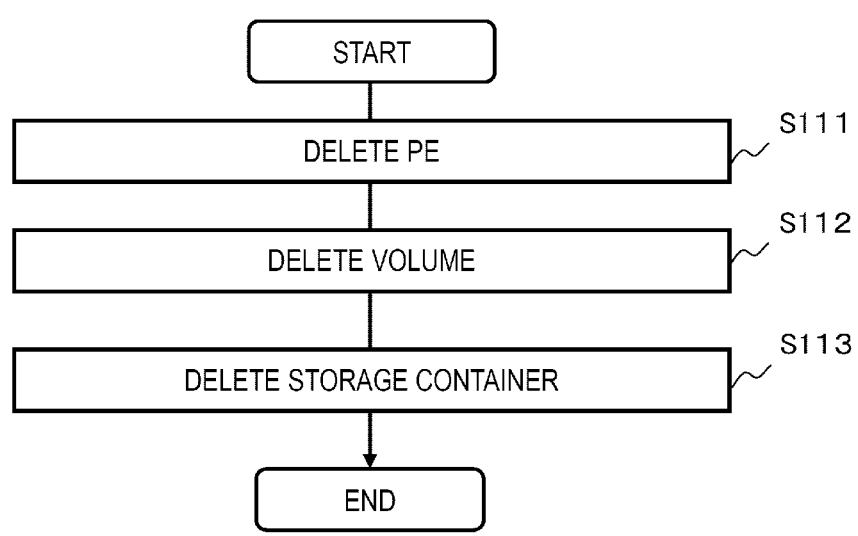

STORAGE SYSTEM AND DATA MIGRATION METHOD OF MIGRATING GROUP OF VOLUME AND LOGICAL RESOURCES OF THE VOLUME

BACKGROUND OF THE INVENTION

1. Field of the Invention

The present invention relates to a storage system and a data migration method.

2. Description of the Related Art

A virtual volume (also referred to as VVOL) whose volume can be managed from a virtual machine (VM) via an application programming interface (API) on a cloud environment is provided by a VMware. A volume migration (also referred to as volume migration) in the VVOL environment of the VMware is implemented by a host-based Storage vMotion.

Further, JP-A-2015-207277 discloses a data migration method in which a migration source primary volume (P-VOL) and a migration destination secondary volume (S-VOL) that form a volume pair in a migration source storage system are migrated to a migration destination storage system without interruption.

However, in the host-based Storage vMotion, since a volume migration is executed via a virtual machine that can access a migration source storage and a migration destination storage, a load of a server that provides the virtual machine as a host increases. In order to reduce the load on the server, a storage-based volume migration with a storage as a main component is desired.

Further, JP-A-2015-207277 does not disclose the storage-based volume migration in the VVOL environment.

SUMMARY OF THE INVENTION

The invention has been made in view of the above circumstances, and an object of the invention is to provide a storage system and a data migration method with which the storage-based migration can be performed in the VVOL environment.

In order to achieve the above object, a storage system according to a first aspect includes a plurality of storages each having a processor, in which a migration group in which a virtual volume, a first logical resource used to access the virtual volume, and a second logical resource used to create the virtual volume are grouped is generated in the storage, and the migration group is migrated from a migration source storage to a migration destination storage.

According to the invention, a storage-based migration can be performed in a VVOL environment.

BRIEF DESCRIPTION OF THE DRAWINGS

FIG. 8 is a diagram showing an example of a volume management table of FIG. 1.

FIG. 17 is a flowchart showing a deletion process of the migration source volume and the storage container of FIG. 10.

DESCRIPTION OF THE PREFERRED EMBODIMENTS

An embodiment will be described with reference to drawings. It should be noted that the embodiment described below does not limit the invention according to the claims, and all the elements and combinations thereof described in the embodiment are not necessarily essential to the solution to the problem.

Figure 1:
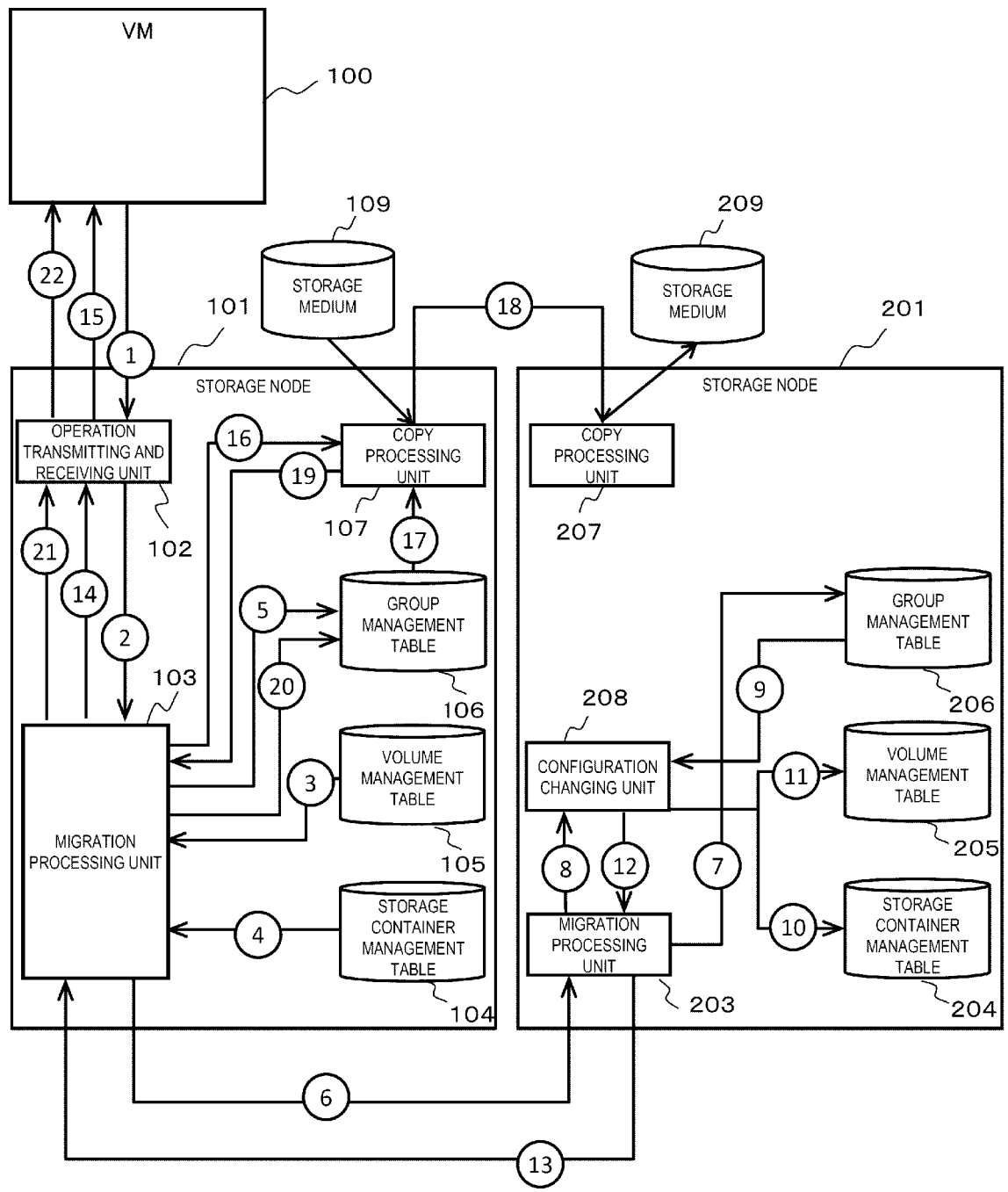
FIG. 1 is a block diagram showing a flow of a migration process when a migration source volume and a storage container are remained after migration in a storage system according to an embodiment.

FIG. 1 is a block diagram showing a flow of a migration process when a migration source volume and a storage container are remained after migration in a storage system according to an embodiment.

In FIG. 1, the storage system includes storage nodes 101, 201. The storage node 101 is accessible from a virtual machine 100. The virtual machine 100 can operate as a host for the storage node 101. At this time, the storage node 101 can set an operation in unit of the virtual machine 100 by setting a virtual volume.

The storage node 101 is connected to a storage medium 109, and the storage node 201 is connected to a storage medium 209. The storage medium 109, 209 are, for example, physical storage devices such as magnetic disk devices or solid state drives (SSD). The storage medium 109 stores data corresponding to logical resources managed by the storage node 101. The storage medium. 209 stores data corresponding to logical resources managed by the storage node 201.

Hereinafter, configurations and operations of the storage nodes 101, 201 will be described by taking a case where the storage node 101 is a migration source storage and the storage node 201 is a migration destination storage as an example.

The storage node 101 generates a migration group in which a virtual volume to be migrated, a first logical resource used to access the virtual volume to be migrated, and a second logical resource used to create the virtual volume to be migrated are grouped, and the logical resources of the migration group are migrated to the storage node 201. The first logical resource is, for example, a protocol endpoint (also referred to as PE) that manages access to the virtual volume. The second logical resource is, for example, a storage container that cuts out the virtual volume. Further, the storage node 101 starts migration of the logical resources of the migration group based on an instruction from the virtual machine 100, and returns a response to the virtual machine 100 when the migration of the logical resources of the migration group is completed. At this time, the storage node 101 migrates the logical resources of the migration group to the storage node 201 without interposing the virtual machine 100 between the storage nodes 101, 201.

Specifically, the storage node 101 includes an operation transmitting and receiving unit 102, a migration processing unit 103, a storage container management table 104, a volume management table 105, a migration group management table 106, and a copy processing unit 107.

The operation transmitting and receiving unit 102 communicates with the virtual machine 100, receives the instruction from the virtual machine 100, and transmits the response to the virtual machine 100. The migration processing unit 103 generates, based on a relationship between the virtual volume to be migrated and the logical resource related to the virtual volume, a migration group in which those logical resources are grouped, and migrates the logical resource of the migration group to the storage node 201.

In the storage container management table 104, information on the storage containers managed by the storage node 101 is registered. In the volume management table 105, information on the virtual volumes managed by the storage node 101 is registered. At this time, in the volume management table 105, information on a relationship between the virtual volume and the storage container managed by the storage node 101, and a relationship between the protocol endpoint and the virtual volume is registered as management information. In the migration group management table 106, information on the migration group in which the virtual volume to be migrated, the protocol endpoint, and the storage container are grouped, and the migration destination storage is registered.

Here, the storage node 101 can allocate a real ID and a virtual ID when managing the virtual volume, the protocol endpoint, and the storage container. The real ID is an ID managed in the storage node 101. The virtual ID is an ID that can be referenced based on the virtual machine 100. At this time, the virtual machine 100 can access the virtual volume corresponding to the virtual ID by specifying the virtual ID.

The copy processing unit 107 reads data corresponding to the logical resource of the migration group to be migrated from the storage medium 109 and copies the data from the storage node 101 to the storage node 201.

The storage node 201 includes a migration processing unit 203, a storage container management table 204, a volume management table 205, a migration group management table 206, a copy processing unit 207, and a configuration changing unit 208.

The migration processing unit 203 performs processing of configuring the logical resources of the migration group migrated from the storage node 101 on the storage node 201. Based on the information of the migration group transmitted from the storage node 101, the configuration changing unit 208 configures, on the storage node 201, a protocol endpoint, a virtual volume, and a storage container the same as the protocol endpoint, the virtual volume, and the storage container configured in the storage node 101.

At this time, the configuration changing unit 208 allocates a virtual ID the same as the virtual ID allocated by the storage node 101 to each of the protocol endpoint, the virtual volume, and the storage container migrated to the storage node 201. Accordingly, users of the storage nodes 101, 201 can operate the storage node 201 in the same manner as the storage node 101.

In the storage container management table 204, information on the storage containers managed by the storage node 201 is registered. In the volume management table 205, information on the virtual volumes managed by the storage node 201 is registered. In the migration group management table 206, information on the migration group in which the virtual volume, the protocol endpoint, and the storage container which are migrated from the storage node 101 are grouped is registered. The copy processing unit 207 stores, in the storage medium 209, data corresponding to the logical resources of the migration group copied from the storage node 101.

A migration operation between the storage nodes 101, 201 will be described below.

The storage node 101 receives a migration request from the virtual machine 100, which is a host, via the operation transmitting and receiving unit 102 (1). In the migration request, the virtual machine 100 specifies a protocol endpoint as a migration target.

Next, when the migration processing unit 103 receives the migration request requested from the virtual machine 100 (2), the storage container management table 104 and the volume management table 105 are referred, so as to acquire the information on a virtual volume related to the protocol endpoint included in the migration request and the information on a storage container related to the virtual volume (3, 4).

Next, the migration processing unit 103 generates a migration group in which the protocol endpoint included in the migration request, the virtual volume related to the protocol endpoint, and the storage container related to the virtual volume are grouped, and reflects information of the migration group in the migration group management table 106 (5).

Next, the migration processing unit 103 transmits the information of the migration group to the migration processing unit 203 (6). At this time, the migration processing unit 103 transmits the information of the migration group to the migration processing unit 203 without interposing the virtual machine 100. The information of the migration group includes a virtual ID allocated to the protocol endpoint included in the migration group, a virtual ID allocated to the virtual volume related to the protocol endpoint, and a virtual ID allocated to the storage container related to the virtual volume.

Next, the migration processing unit 203 reflects the information of the migration group received from the migration processing unit 103 in the migration group management table 206 (7). Then, the migration processing unit 203 instructs the configuration changing unit 208 to configure the protocol endpoint, the virtual volume, and the storage container of the migration group migrated from the storage node 101 on the storage node 201 (8).

Next, the configuration changing unit 208 refers to the migration group management table 206, and acquires information on the migration group instructed by the migration processing unit 203 (9). Then, based on the information of the migration group acquired from the migration group management table 206, the configuration changing unit 208 creates a protocol endpoint, a virtual volume related to the protocol endpoint, and a storage container related to the virtual volume migrated from the storage node 101, and reflects these in the storage container management table 204 and the volume management table 205 (10, 11).

Next, the configuration changing unit 208 notifies the migration processing unit 203 that creation of the protocol endpoint, the virtual volume, and the storage container migrated from the storage node 101 is completed (12), and the migration processing unit 203 notifies the migration processing unit 103 that the creation is completed (13).

Next, the migration processing unit 103 notifies the virtual machine 100 that I/O can be performed via the operation transmitting and receiving unit 102 (14, 15).

Next, the migration processing unit 103 instructs the copy processing unit 107 to execute a data copy process on the migration group migrated from the storage node 101 to the storage node 201 (16). When the copy processing unit 107 receives an instruction to execute the data copy process for the migration group, the group management table 106 is referred, and information on the protocol endpoint, information on the virtual volume, and information on the storage container for the migration group are acquired (17). Then, the copy processing unit 107 reads data regarding the migration group from the storage medium. 109 and transmits the data to the copy processing unit 207, and the copy processing unit 207 writes the data transmitted from the copy processing unit 107 in the storage medium 209 (18).

Next, the copy processing unit 107 notifies the migration processing unit 103 that the data copy process is completed (19), and the migration processing unit 103 reflects the completion of the migration in the migration group management table 106 (20).

Next, the migration processing unit 103 notifies the virtual machine 100 that the migration is completed in response to the migration request from the virtual machine 100 via the operation transmitting and receiving unit 102 (21, 22).

As a result, the virtual machine 100 does not access the storage node 201 that is the migration destination, and the storage node 101 can migrate the protocol endpoint, the virtual volume, and the storage container to the storage node 201. Therefore, a storage-based migration in a VVOL environment can be performed, and a load on a server providing the virtual machine 100 can be reduced.

Further, the migration processing unit 203 also takes over the virtual ID of the protocol endpoint, the virtual ID of the virtual volume, and the virtual ID of the storage container of the migration group migrated from the storage node 101, and reflects these in the migration group management table 206, and meanwhile, the configuration changing unit 208 creates the protocol endpoints, the virtual volumes, and the storage containers on the storage node 201, so that configurations of the protocol endpoints, virtual volumes, and storage containers of the migration group migrated from the storage node 101 are reflected. Therefore, the host issues to the storage node 201 a command in which a virtual ID the same as when accessing the storage node 101 is set, so that the host can cause the storage node 201 to execute the same process as when the storage node 101 executes the same.

Figure 2:
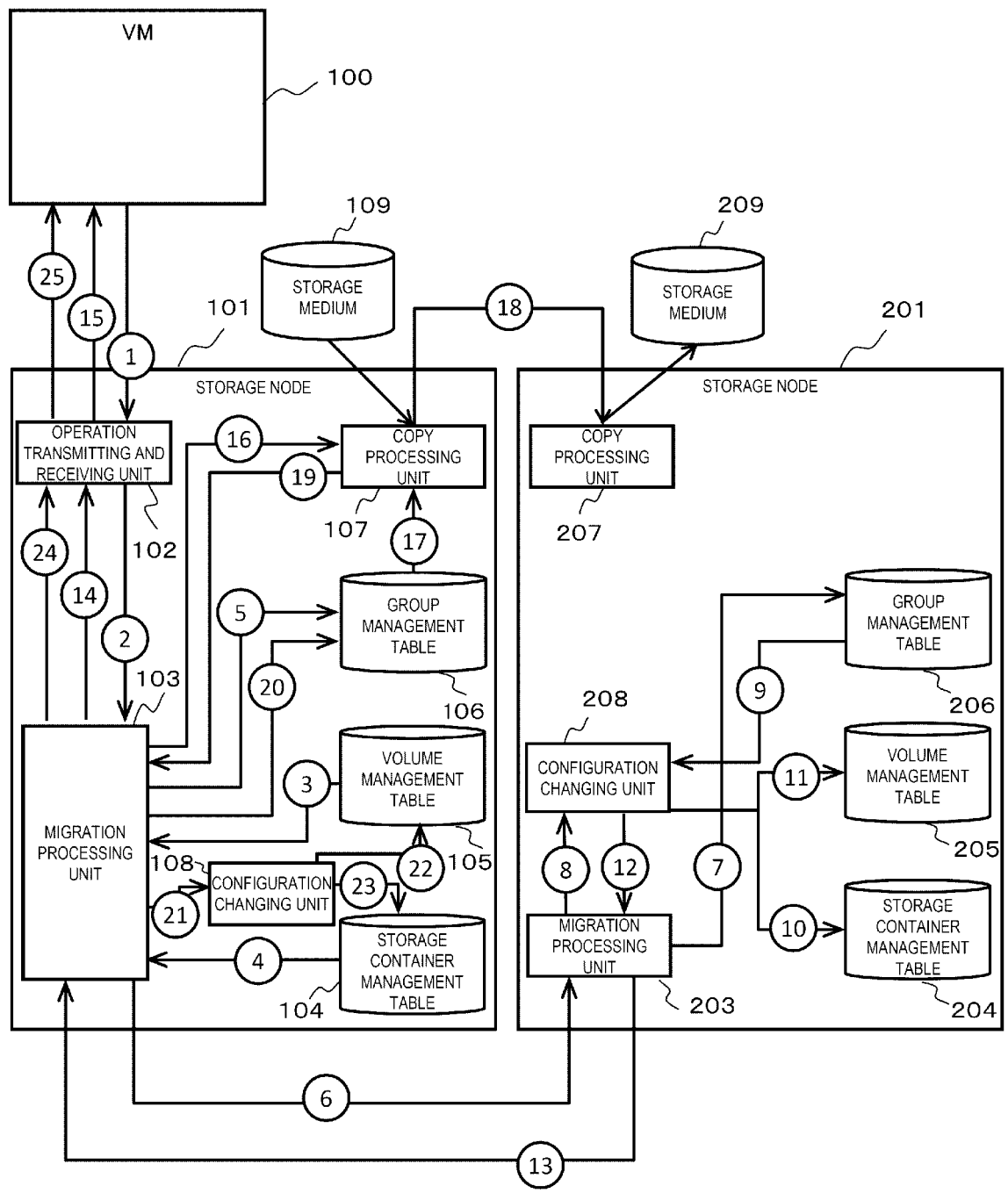
FIG. 2 is a block diagram showing a flow of a migration process when the migration source volume and the storage container are deleted after the migration in the storage system according to the embodiment.

FIG. 2 is a block diagram showing a flow of a migration process when the migration source volume and the storage container are deleted after the migration in the storage system according to the embodiment.

In FIG. 2, the storage node 101 includes a configuration changing unit 108 in addition to the configuration of FIG. 1. The configuration changing unit 108 deletes the protocol endpoint, the virtual volume, and the storage container, which are migrated from the storage node 101, from the storage node 101. In this case, the migration processing unit 103 also adds, to the migration group, a virtual volume that is not the migration target and is associated with the storage container that is the migration target, and migrates the virtual volume to the storage node 201.

Hereinafter, a migration operation between the storage nodes 101, 201 of FIG. 2 will be described below with respect to differences from the migration operation of FIG. 1.

When the data copy process is completed, the copy processing unit 107 notifies the migration processing unit 103 that the data copy process is completed (19), and the migration processing unit 103 reflects the completion of the migration in the migration group management table 106 (20).

Next, the migration processing unit 103 instructs that the configuration changing unit 108 deletes the protocol endpoint, the virtual volume, and the storage container, which are migrated from the storage node 101, from the storage node 101 (21).

Next, the configuration changing unit 108 deletes the protocol endpoint, the virtual volume, and the storage container, which are migrated from the storage node 101, from the storage node 101, and reflects the deletion in the storage container management table 104 and the volume management table 105 (22, 23).

Next, the migration processing unit 103 notifies the virtual machine 100 that the migration is completed in response to the migration request from the virtual machine 100 via the operation transmitting and receiving unit 102 (24, 25).

Figure 3:
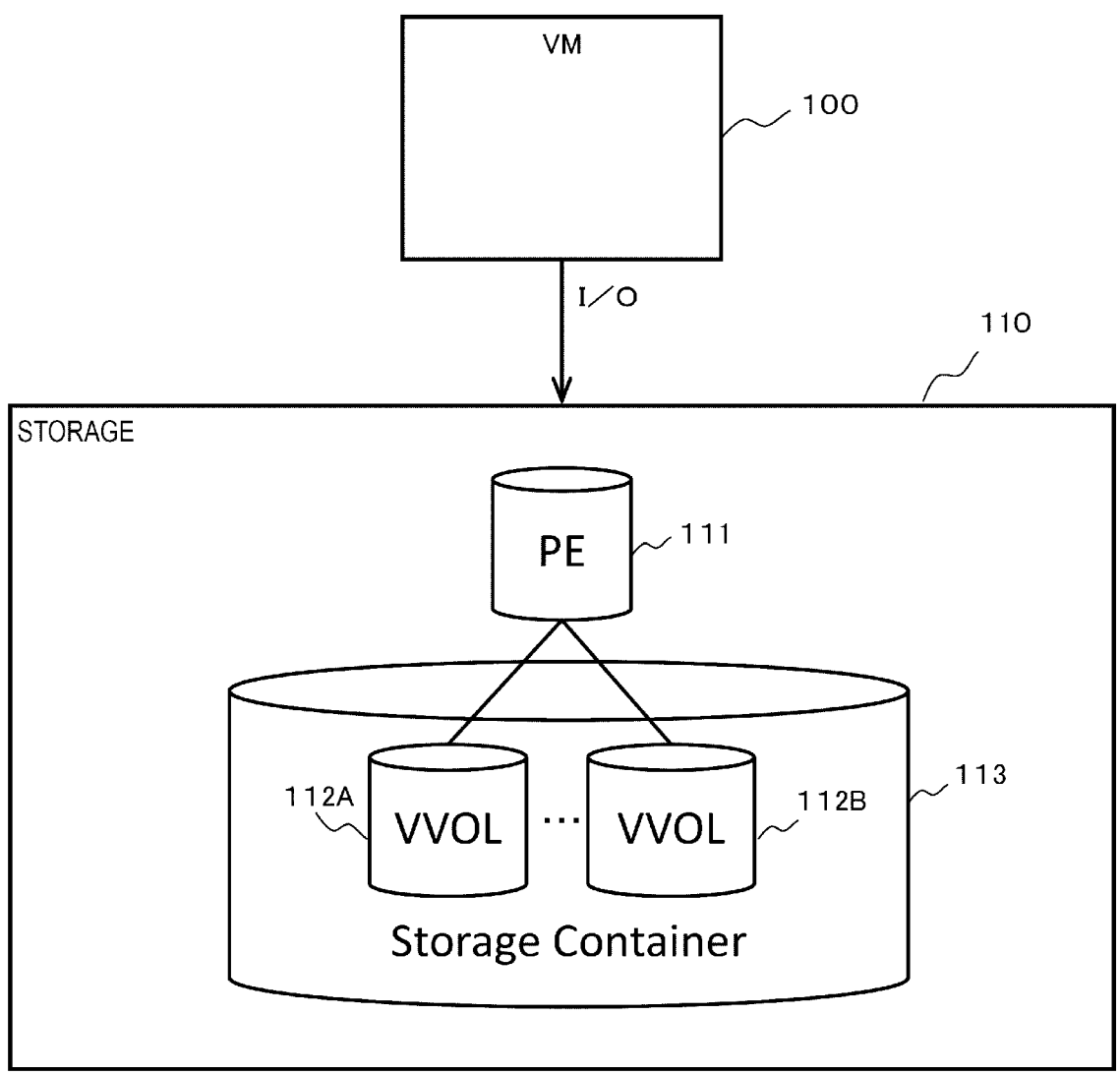
FIG. 3 is a block diagram showing a configuration of a storage in a VVOL environment of the storage system according to the embodiment.

FIG. 3 is a block diagram showing a configuration of a storage in the VVOL environment of the storage system according to the embodiment.

In FIG. 3, a storage 110 includes a protocol endpoint 111, virtual volumes 112A, 112B associated with the protocol endpoint 111, and a storage container 113 from which the virtual volumes 112A, 112B are generated.

The protocol endpoint 111 provides a unified interface for the virtual machine 100 to access the virtual volumes 112A, 112B. The storage container 113 is a storage pool for generating the virtual volumes 112A, 112B.

Here, by defining the virtual volumes 112A, 112B under the protocol endpoint 111, the virtual machine 100 can access the virtual volumes 112A, 112B without changing operations and an I/O method according to an access protocol, and meanwhile, limitation of the number of logical units (LUs) according to the SCSI standards can be avoided, and the number of volumes can be increased without increasing the number of physical ports.

Figure 4:
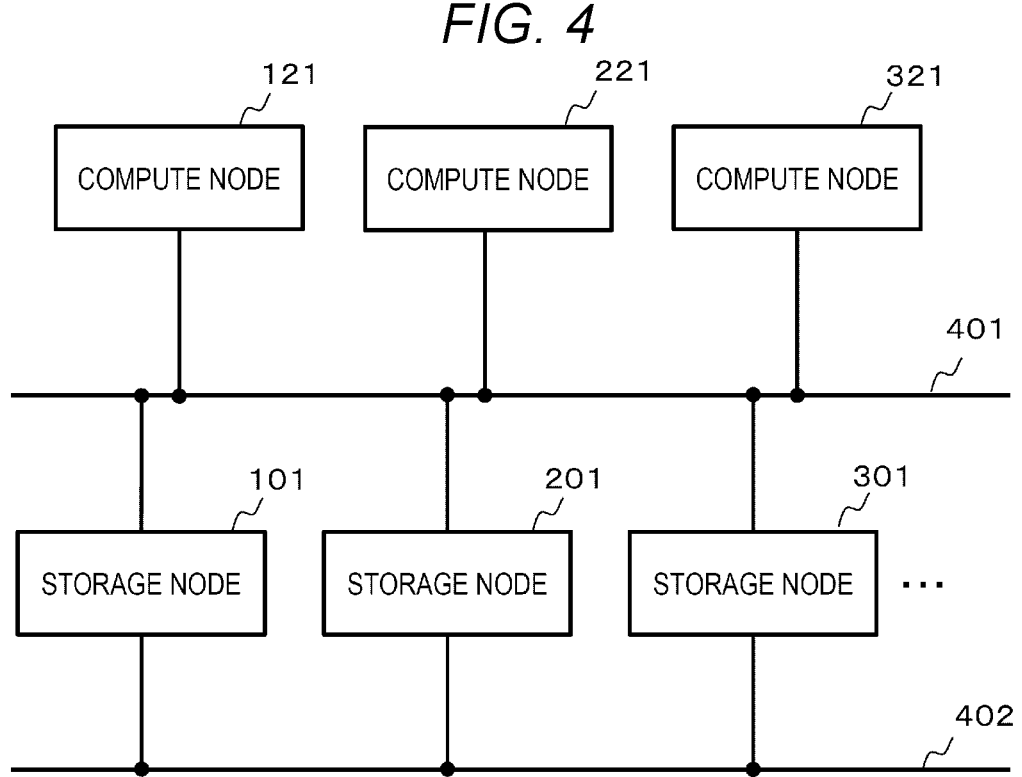
FIG. 4 is a block diagram showing an example of a network environment used in the storage system of FIG. 1.

FIG. 4 is a block diagram showing an example of a network environment used in the storage system of FIG. 1.

In FIG. 4, the storage system includes storage nodes 101, 201, 301. The storage nodes 101, 201, 301 are connected to compute nodes 121, 221, 321 via a storage service network 401. The storage nodes 101, 201, 301 are connected to each other via a backend network 402. The storage service network 401 and the backend network 402 may be a wide area network (WAN) such as an internet, may also be a local area network (LAN) such as a WiFi or an ethernet (registered trademark), or may also be a combination of the WAN and the LAN. Further, a same network may be used as the storage service network 401 and the backend network 402. Each of the compute nodes 121, 221, 321 can operate as a host for the storage nodes 101, 201, 301.

Here, the storage service network 401 can be used, for example, for communication (1, 15, 22) between the virtual machine 100 and the storage node 101 in FIG. 1, and the backend network 402 can be used for communication (6, 13, 18) between the storage nodes 101, 201.

Figure 5:
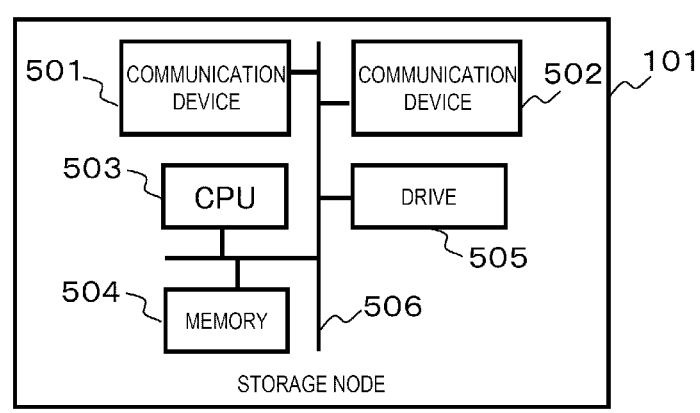
FIG. 5 is a block diagram showing an example of a hardware configuration of a storage node of FIG. 4.

FIG. 5 is a block diagram showing an example of a hardware configuration of the storage node of FIG. 4. The compute node of FIG. 4 has a configuration same as that of FIG. 5.

In FIG. 5, the storage node 101 includes communication devices 501, 502, a CPU 503, a memory 504, and a drive 505. The communication devices 501, 502, the CPU 503, the memory 504, and the drive 505 are connected to each other via a bus 506.

The communication device 501 communicates with the compute nodes 121, 221, 321 via the storage service network 401 of FIG. 4. The communication device 502 communicates with other storage nodes 201, 301 via the backend network 402.

The CPU 503 is hardware that controls all the operations of the storage node 101. The CPU 503 can implement functions of the operation transmitting and receiving unit 102, the migration processing unit 103, and the copy processing unit 107 in FIG. 1 by executing programs stored in the memory 504.

The memory 504 may be configured with, for example, a semiconductor memory such as an SRAM or a DRAM. The memory 504 can store a program being executed by the CPU 503, or can be provided with a work area for the CPU 503 to execute the program.

The drive 505 is a storage device having a large storage capacity, and is, for example, a hard disk drive or a solid state drive (SSD). The drive 505 can store data that is used for execution files of various programs or used for execution of a program.

Figure 6:
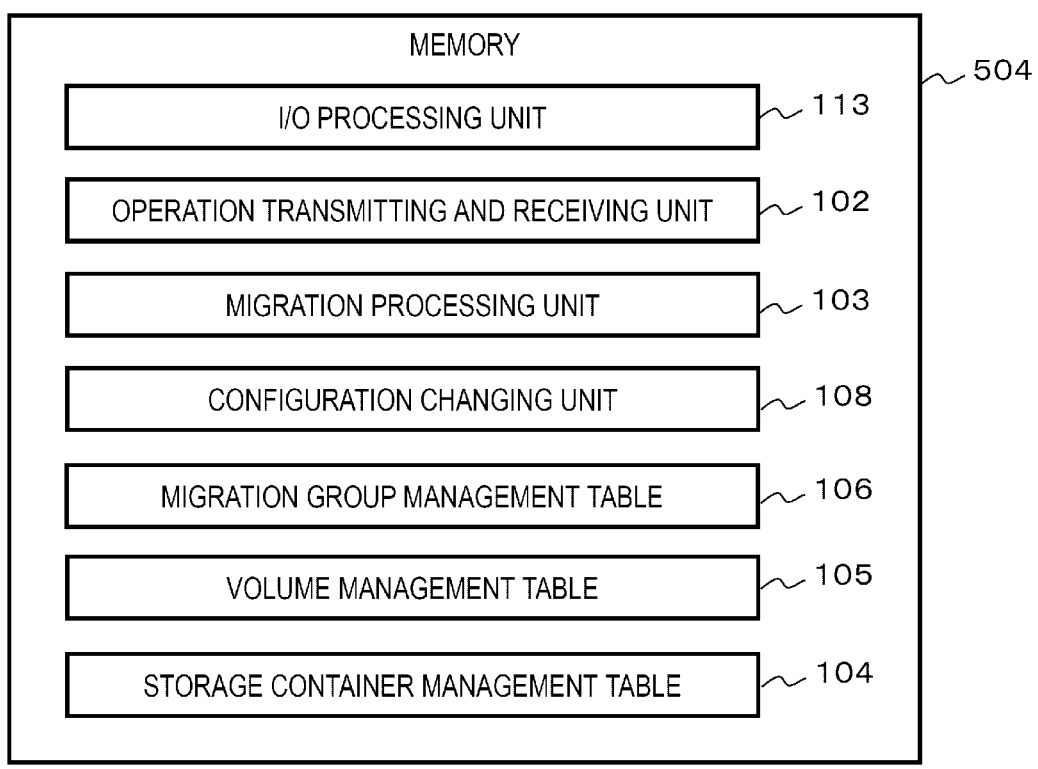
FIG. 6 is a block diagram showing contents of a memory of FIG. 5.

FIG. 6 is a block diagram showing contents of the memory of FIG. 5.

In FIG. 6, the memory 504 holds an I/O processing unit 113, the operation transmitting and receiving unit 102, the migration processing unit 103, the configuration changing unit 108, the storage container management table 104, the volume management table 105 and the migration group management table 106. The I/O processing unit 113, the operation transmitting and receiving unit 102, the migration processing unit 103, the copy processing unit 107, and the configuration changing unit 108 can be configured with a program that causes the CPU 503 to implement those functions.

Figure 7:
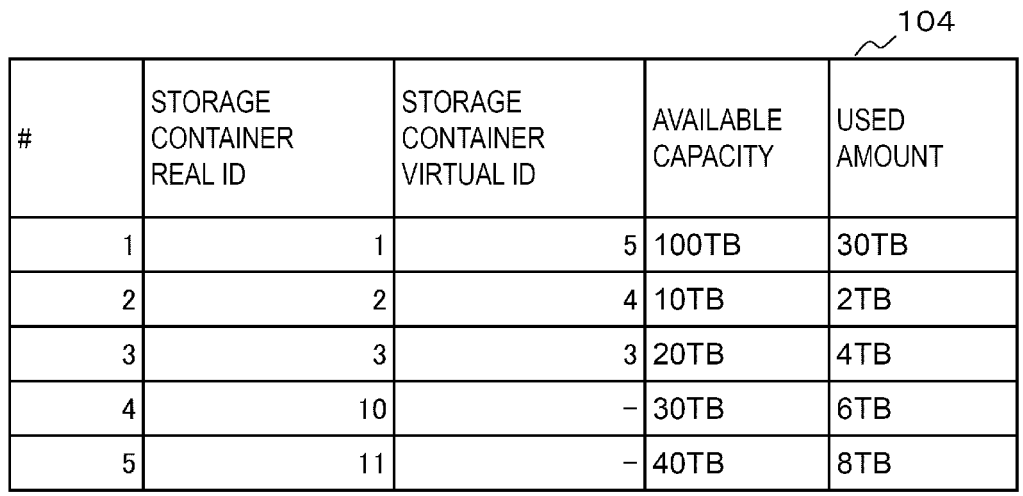
FIG. 7 is a diagram showing an example of a storage container management table of FIG. 1.

FIG. 7 is a diagram showing an example of the storage container management table of FIG. 1.

In FIG. 7, the storage container management table 104 includes an entry number #, a storage container real ID, a storage container virtual ID, an available capacity, and a used amount of the entry. The storage container real ID indicates an ID used for internally managing the storage containers. The storage container virtual ID indicates an ID of a storage container that can be referenced from the host. The available capacity indicates a capacity that is available for the storage container. The used amount indicates an actually used capacity of the storage container.

FIG. 8 is a diagram showing an example of the volume management table of FIG. 1.

In FIG. 8, the volume management table 105 includes an entry number #, a volume real ID, a volume virtual ID, a storage container real ID, a PE/VVOL, a volume real ID of the associated PE, an LUN, a capacity, a migration group ID, and an entry of a migration status.

The volume real ID indicates an ID used for internally managing the virtual volumes. The volume virtual ID indicates an ID of a virtual volume that can be referenced from the host. The storage container real ID indicates an ID used for internally managing the storage containers. The PE/VVOL indicates whether an entry of the entry number # is a protocol endpoint or a virtual volume. The volume real ID of the associated PE indicates a volume real ID associated with the PE. The LUN indicates a logical unit number. The capacity indicates a capacity of the virtual volume. The migration group ID indicates an ID of the migration group. The migration status indicates whether the protocol endpoint or the virtual volume indicated by the PE/VVOL is before migration, during migration, or already migrated.

Figure 9:
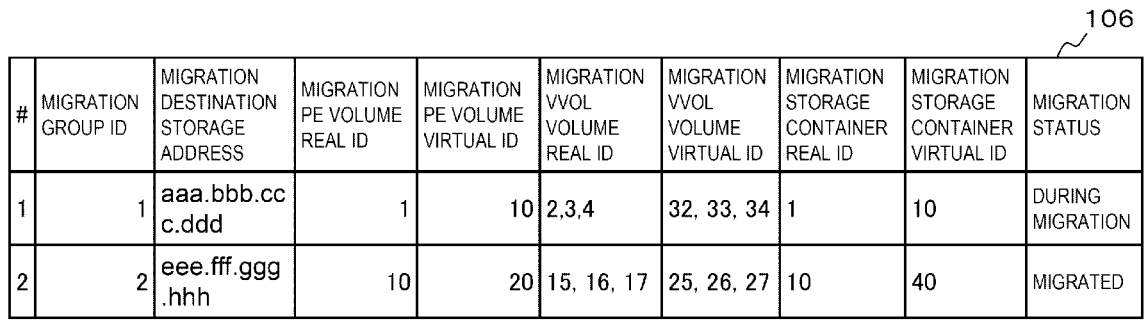
FIG. 9 is a diagram showing an example of a migration group management table of FIG. 1.

FIG. 9 is a diagram showing an example of the migration group management table of FIG. 1.

In FIG. 9, the migration group management table 106 includes an entry number #, a migration group ID, a migration destination storage address, a migration PE volume real ID, a migration PE volume virtual ID, a migration VVOL volume real ID, a migration VVOL volume virtual ID, a migration storage container real ID, a migration storage container virtual ID, and an entry of a migration status.

The migration group ID indicates an ID of a migration group. The migration destination storage address indicates an address of a migration destination storage. The migration PE volume real ID indicates an ID used for internally managing a PE that is the migration target. The migration PE volume virtual ID indicates an ID of a migration target PE that can be referenced from the host. The migration VVOL volume real ID indicates an ID used for internally managing the virtual volume that is the migration target. The migration VVOL volume virtual ID indicates an ID of a virtual volume that is the migration target and can be referenced from the host. The migration storage container real ID indicates an ID used for internally managing the storage container that is the migration target. The migration storage container virtual ID indicates an ID of a storage container that is the migration target and can be referenced from the host. The migration status indicates whether the migration group indicated by the migration group ID is before migration, during migration, or already migrated.

Hereinafter, an operation flow of the storage system of FIGS. and 2 will be specifically described. In the following description, a case where the virtual machine 100 in FIGS. 1 and 2 is the host, the storage node 101 is the migration source, and the storage node 201 is the migration destination is taken as an example.

Figure 10:
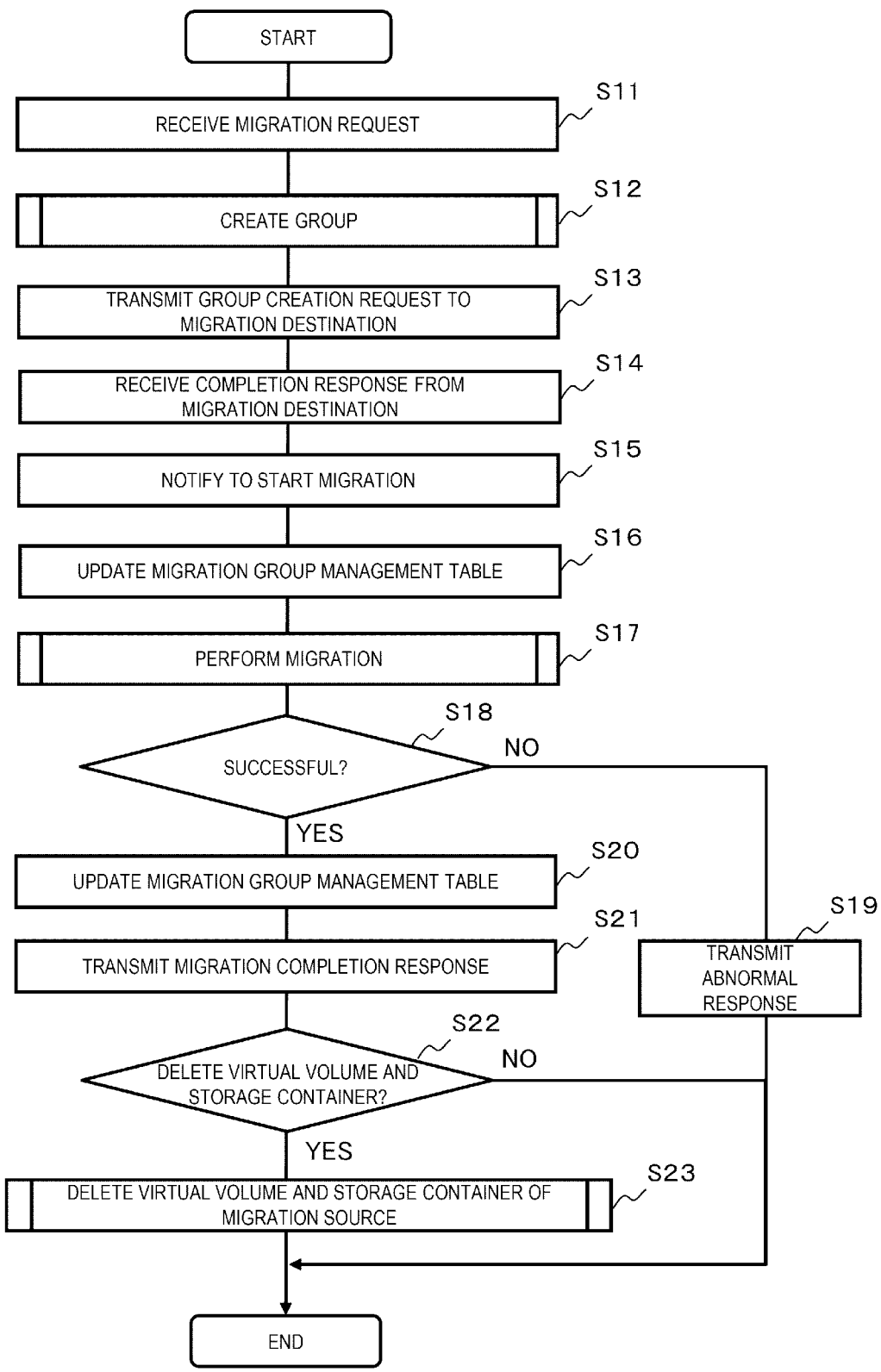
FIG. 10 is a flowchart showing a flow of an entire process of the migration source during migration execution according to the embodiment.

FIG. 10 is a flowchart showing a flow of an entire process of the migration source during migration execution according to the embodiment.

In FIG. 10, the migration processing unit 103 receives a migration request from the virtual machine 100 (S11). In the migration request, the virtual machine 100 specifies a migration destination and a migration target. The migration source storage node 101 shows the protocol endpoint, the virtual volume, and the storage container to the virtual machine 100 operating as an own host, and the virtual machine 100 specifies at least one of a protocol endpoint, a virtual volume, and a storage container as a migration target. In the description below, the virtual machine 100 specifies the protocol endpoint as the migration target. At this time, the virtual machine 100 can use the virtual ID of protocol endpoint to specify the protocol endpoint. In addition, the virtual machine 100 can include a deletion request for the virtual volume of the migration source and the storage container in the migration request.

Next, when the migration processing unit 103 receives the migration request requested from the virtual machine 100, the migration processing unit 103 creates a migration group according to the migration request (S12). That is, the migration processing unit 103 creates a migration group to which at least one of the protocol endpoint, the virtual volume, and the storage container specified as the migration target according to the migration request belongs.

Figure 11:
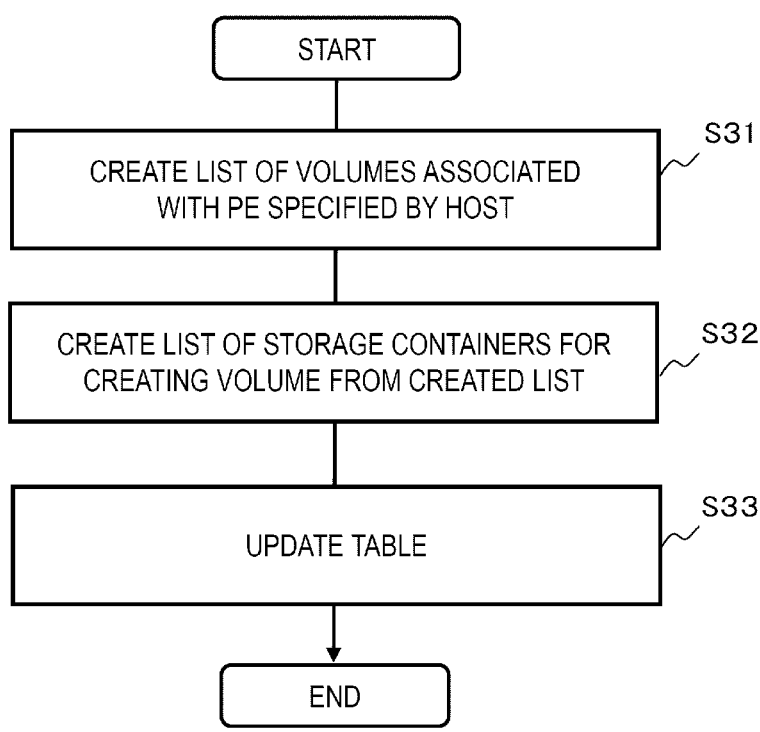
FIG. 11 is a flowchart showing a group creation process when the migration source volume and the storage container are remained after the migration.

Here, when deletion of the virtual volume of the migration source and the storage container is not requested, the migration processing unit 103 executes a group creation processing of FIG. 11, and creates a migration group in which the protocol endpoint included in the migration request, the virtual volume associated with the protocol endpoint, and the storage container associated with the virtual volume are grouped.

Figure 16:
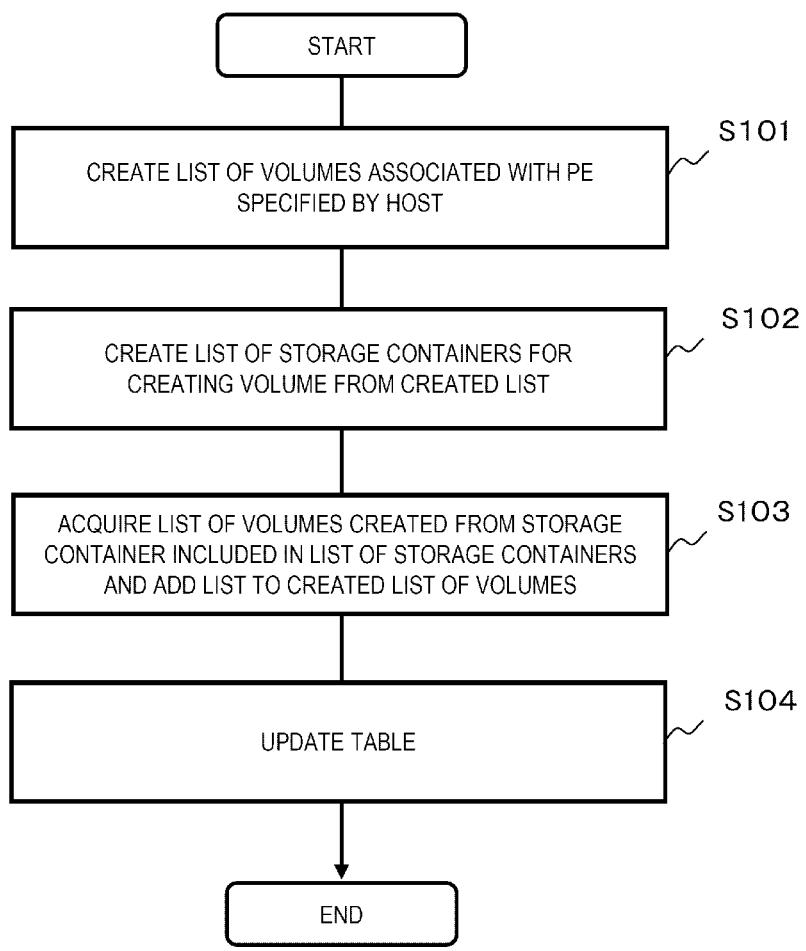
FIG. 16 is a flowchart showing a group creation process when the migration source volume and the storage container are deleted after the migration.

On the other hand, when the deletion of the virtual volume of the migration source and the storage container is requested, the migration processing unit 103 executes a group creation processing of FIG. 16, and creates a migration group in which the protocol endpoint included in the migration request, the virtual volume associated with the protocol endpoint, the storage container associated with the virtual volume, and the virtual volume that is not the migration target and is associated with the storage container are grouped.

Next, the migration processing unit 103 transmits a migration group creation request to the storage node 201 (S13). At this time, when the deletion of the virtual volume of the migration source and the storage container is not requested, the migration processing unit 103 includes a virtual ID allocated to the protocol endpoints included in the migration group, a virtual ID allocated to the virtual volume associated with the protocol endpoint, and a virtual ID allocated to the storage container associated with the virtual volume in the migration group creation request.

On the other hand, when the deletion of the virtual volume of the migration source and the storage container is requested, the migration processing unit 103 includes the virtual ID allocated to the protocol endpoints included in the migration group, the virtual ID allocated to the virtual volume associated with the protocol endpoint, the virtual ID allocated to the storage container associated with the virtual volume, and a virtual ID allocated to the virtual volume that is not the migration target and is associated with the storage container in the migration group creation request.

Next, when the migration processing unit 103 receives a completion response from the storage node 201 (S14), the migration processing unit 103 notifies the copy processing unit 107 to start the migration (S15), and updates the migration status of the migration group management table 106 of FIG. 9 into "during migration" (S16).

Next, in the migration process, the copy processing unit 107 transmits data on the migration group from the storage medium 109 to the storage node 201 (S17).

Next, the migration processing unit 103 determines whether or not the migration process is successful (S18), and when the migration process is failed, returns an abnormal response to the virtual machine 100 (S19).

On the other hand, when the migration process is successful, the migration processing unit 103 updates the migration status of the migration group management table 106 of FIG. 9 to "migrated" (S20), and transmits a migration completion response to the virtual machine 100 (S21).

Next, the migration processing unit 103 determines whether or not the deletion of the virtual volume and storage container is requested (S22), and when the deletion of the virtual volume and storage container is not requested, the migration processing unit 103 ends the process.

On the other hand, when the deletion of the virtual volume and the storage container is requested, the migration processing unit 103 deletes the virtual volume and the storage container included in the migration group from the storage node 101 (S23), and ends the process.

FIG. 11 is a flowchart showing a group creation process when the migration source volume and the storage container are remained after the migration.

In FIG. 11, the migration processing unit 103 of FIG. 1 refers to the volume management table 105 of FIG. 8, and creates a list of virtual volumes associated with the protocol endpoint specified by the virtual machine 100 (S31).

Next, the migration processing unit 103 refers to the volume management table 105 in FIG. 8, and creates a list of storage containers used for creating the virtual volumes from the list of the virtual volumes created in S31 (S32).

Next, the migration processing unit 103 updates the migration group management table 106 of FIG. 9 based on the list of virtual volumes created in S31 and the list of storage containers created in S32 (S33).

Figure 12:
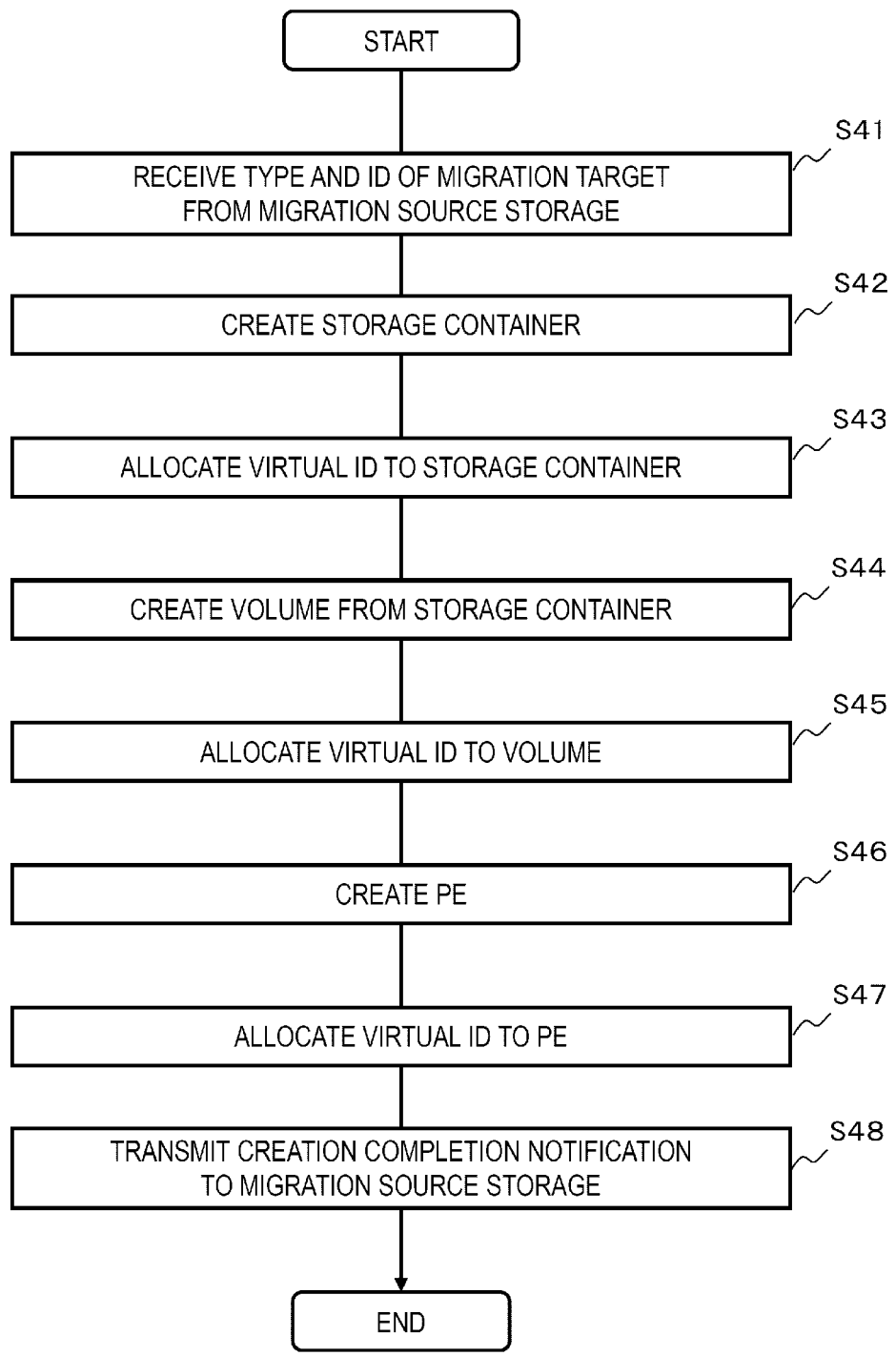
FIG. 12 is a flowchart showing a migration destination process in the migration process of FIG. 10.

FIG. 12 is a flowchart showing a migration destination process in the migration process of FIG. 10.

In FIG. 12, the migration processing unit 203 of FIG. 1 or 2 receives a type and an ID of the migration target from the storage node 101 (S41), and reflects these in the migration group management table 206.

Next, the configuration changing unit 208 creates a storage container based on the migration group reflected in the migration group management table 206 (S42), allocates a virtual ID to the storage container (S43), and reflects the virtual ID in the storage container management table 204. At this time, the configuration changing unit 208 allocates a virtual ID the same as the virtual ID allocated by the migration source to the storage container.

Next, the configuration changing unit 208 refers to the migration group management table 206 to create a virtual volume associated with the storage container created in S42 (S44), allocates a virtual ID to the virtual volume (S45), and reflects the virtual ID in the volume management table 205. At this time, the configuration changing unit 208 allocates a virtual ID the same as the virtual ID allocated by the migration source to the virtual volume.

Next, the configuration changing unit 208 refers to the migration group management table 206 to create a protocol endpoint associated with the virtual volume created in S44 (S46), allocates a virtual ID to the protocol endpoint (S47), and reflects the virtual ID in the volume management table 205. At this time, the configuration changing unit 208 allocates a virtual ID the same as the virtual ID allocated by the migration source to the protocol endpoint.

Next, the migration processing unit 203 transmits a creation completion notification of the protocol endpoints, the virtual volumes and the storage containers included in the migration group to the storage node 101 (S48).

Figure 13:
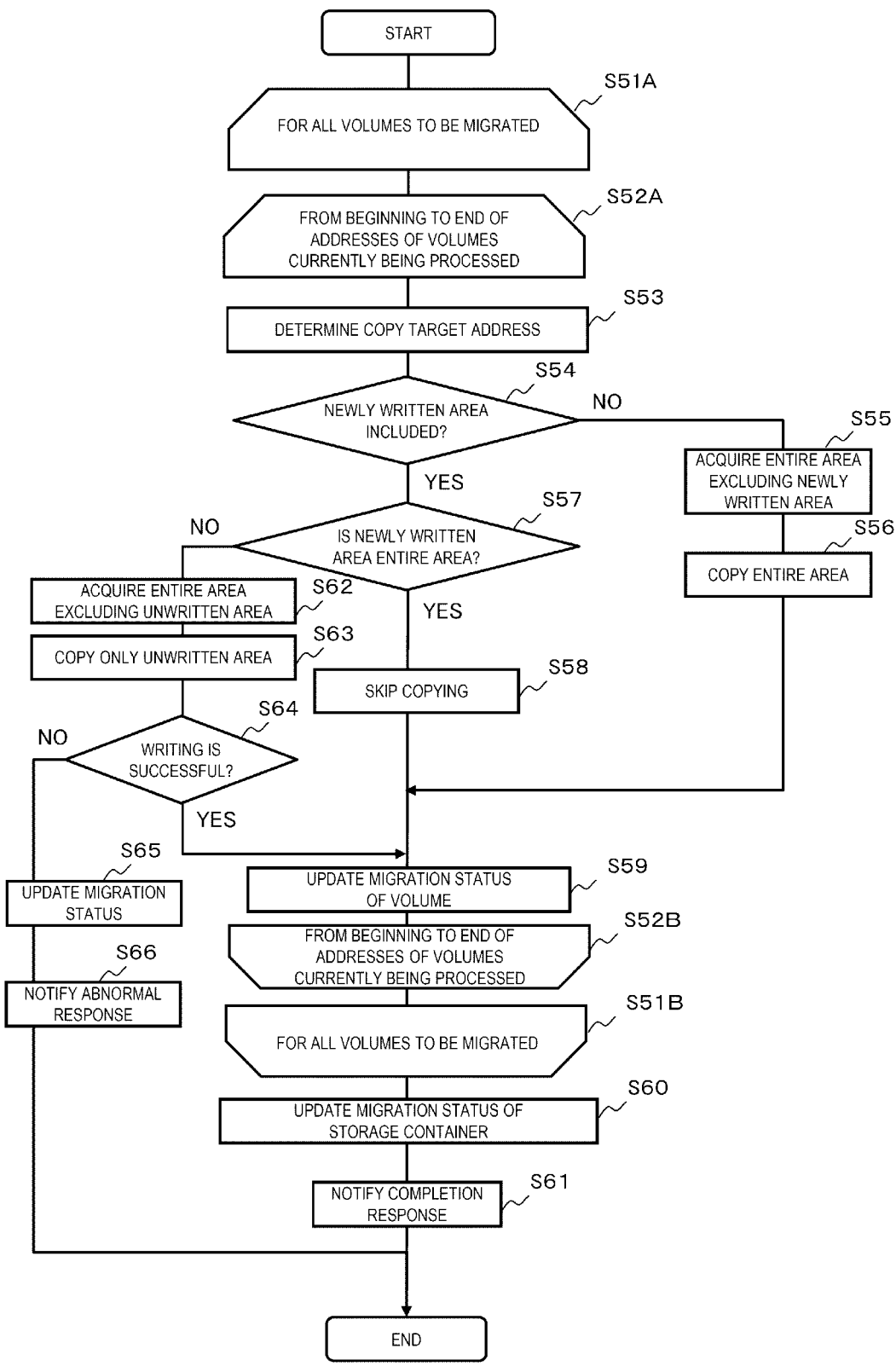
FIG. 13 is a flowchart showing a data copy process during the migration execution according to the embodiment.

FIG. 13 is a flowchart showing a data copy process during the migration execution according to the embodiment.

In FIG. 13, the copy processing unit 107 of FIG. 1 or 2 selects an unselected virtual volume from all the virtual volumes to be migrated (S51A).

Next, the copy processing unit 107 selects an unselected address from the addresses from a beginning to an end of the virtual volumes currently being processed (S52A), and determines a copy target address (S53).

Next, the copy processing unit 107 determines whether or not the copy target address includes a newly written area (S54). The newly written area is an area where the host writes new data. When the copy target address does not include the newly written area, the copy processing unit 107 prohibits the I/O to the copy target address (S55), and copies an entire area specified by the copy target address (S56).

Next, the copy processing unit 107 updates the migration status of the virtual volume currently being processed to "migrated" (S59).

On the other hand, when it is determined in S54 that the copy target address includes the newly written area, the copy processing unit 107 determines whether or not the newly written area is the entire area (S57). When the newly written area is the entire area, the copy processing unit 107 skips the copying (S58) and proceeds to S59.

On the other hand, when it is determined in S57 that the newly written area is not the entire area, the copy processing unit 107 prohibits the I/O to the unwritten area (S62), and copies only the unwritten area (S63).

Next, the copy processing unit 107 determines whether or not writing to the unwritten area is successful (S64). When the writing to the unwritten area is successful, the process proceeds to S59.

Next, the copy processing unit 107 determines whether or not all addresses from the beginning to the end of the virtual volumes currently being processed is selected (S52B), and when these addresses are not all selected, the process returns to S52B; when all these addresses are selected, the process proceeds to S51B.

Next, the copy processing unit 107 determines whether or not all the virtual volumes to be migrated are selected (S51B), and when these virtual volumes are not all selected, the process returns to S51B; when all these addresses are selected, the process proceeds to S60.

Next, the copy processing unit 107 updates the migration status of the storage container associated with the migrated virtual volume to "migrated" (S60), and notifies the migration processing unit 103 of the completion response (S61).

On the other hand, when the copy processing unit 107 determines in S64 that the writing is failed, the copy processing unit 107 updates the migration status (S65), and notifies the migration processing unit 103 of the abnormal response (S66).

Figure 14:
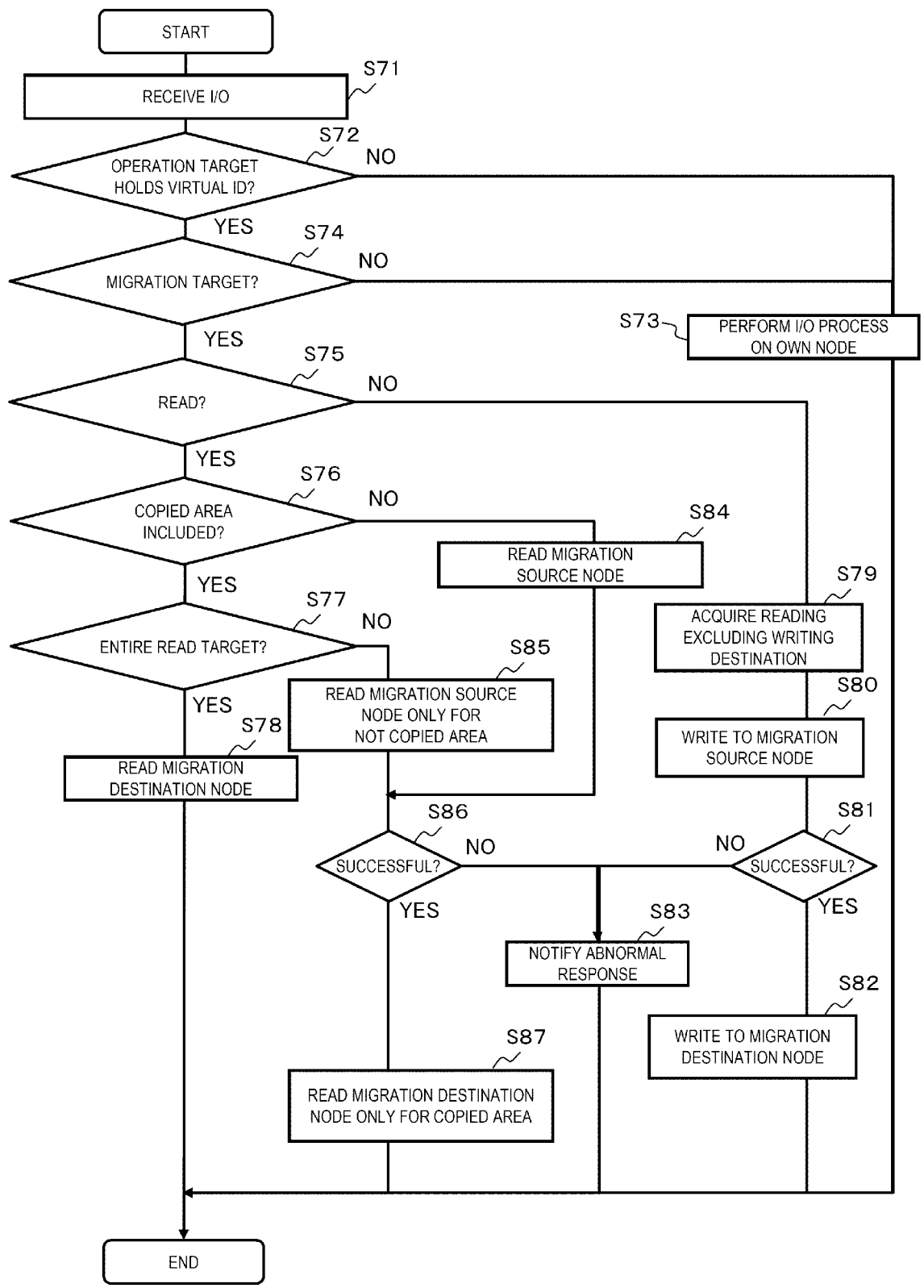
FIG. 14 is a flowchart showing an I/O process during the migration execution according to the embodiment.

FIG. 14 is a flowchart showing an I/O process during the migration execution according to the embodiment.

In FIG. 14, a migration source node or a migration destination node receives the I/O from the host (S71). The I/O from the host is read/write from the host.

Next, the migration source node or the migration destination node determines whether or not an operation target holds a virtual ID (S72). When the operation target does not hold the virtual ID, the migration source node or the migration destination node performs the I/O process on its own node (S73).

On the other hand, when it is determined in S72 that the operation target holds the virtual ID, the migration source node or the migration destination node determines whether or not the operation target is the migration target (S74). When the operation target is not the migration target, the migration source node or the migration destination node proceeds to S73.

On the other hand, when it is determined in S74 that the operation target is the migration target, the migration source node or the migration destination node determines whether or not the I/O is read (S75). When the I/O is read, the migration source node or the migration destination node determines whether or not a read target includes a copied area (S76). When the read target includes the copied area, the migration source node or the migration destination node determines whether or not the copied area is the entire read target (S77). When the copied area is the entire read target, the migration source node or the migration destination node reads from the migration destination node (S78), and ends the process.

On the other hand, when it is determined in S75 that the I/O is write, the migration source node or the migration destination node prohibits the I/O to the write destination (S79), and writes to the migration source node. Here, when a write target is the migration target, by writing to the migration source node, safety of write data during the migration of the write target can be secured.

Next, the migration source node or the migration destination node determines whether or not the writing to the migration source node is successful (S81). When the writing to the migration source node is successful, the migration source node or the migration destination node writes to the migration destination node (S82), and when the writing to the migration source node is failed, the abnormal response is returned to the host (S83).

On the other hand, when it is determined in S76 that the read target does not include the copied area, the migration source node or the migration destination node reads the migration source node (S84).

Next, the migration source node or the migration destination node determines whether or not reading of the migration source node is successful (S86). When the reading of the migration source node is successful, the migration source node or the migration destination node reads the migration destination node only for a not copied area (S87), and when the reading of the migration source node is failed, the process proceeds to S83.

On the other hand, when it is determined in S77 that the copied area is not the entire read target, the migration source node or the migration destination node reads the migration source node only for the not copied area (S85), and the process proceeds to S86.

Figure 15:
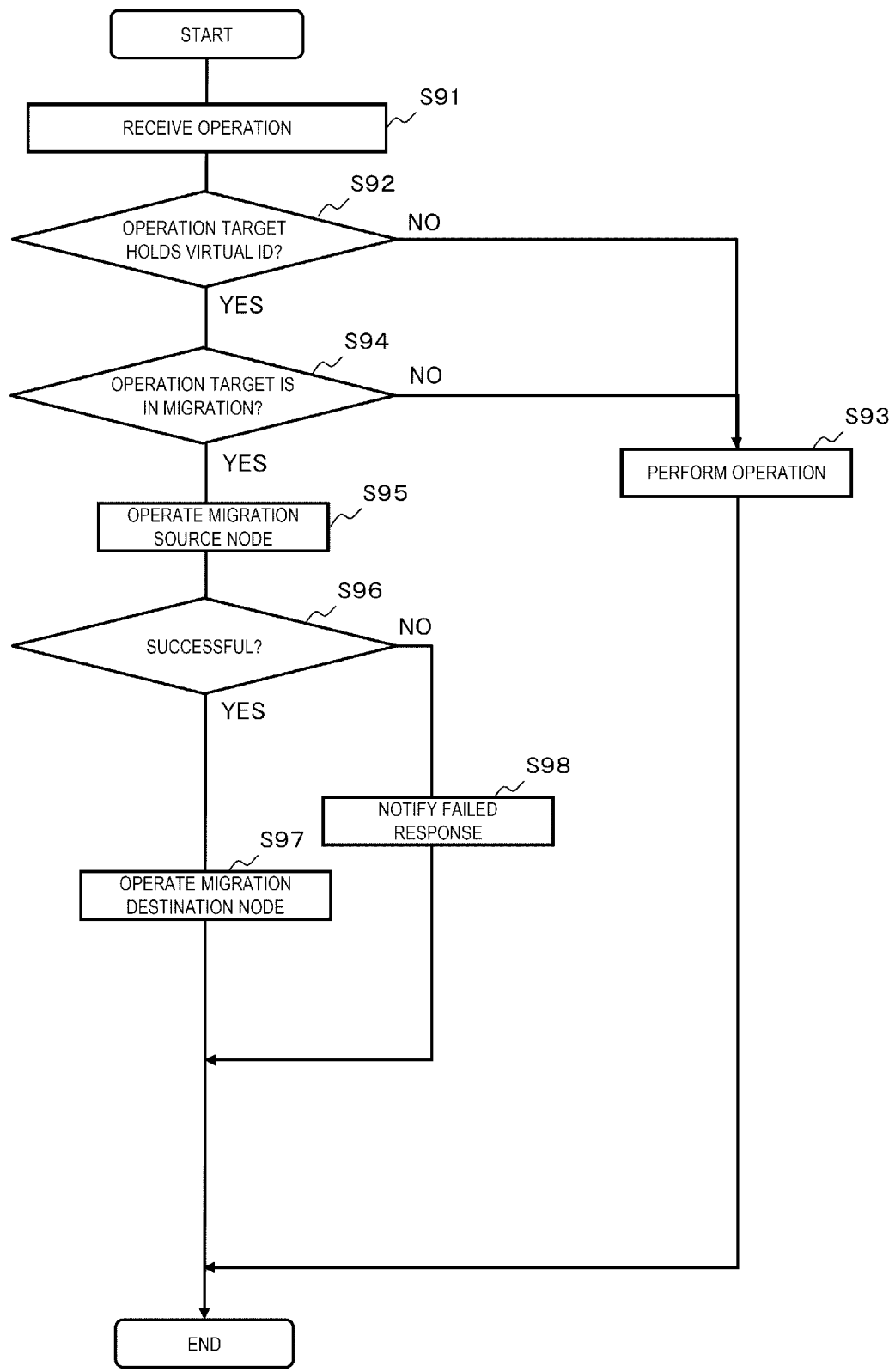
FIG. 15 is a flowchart showing an operation process during the migration execution according to the embodiment.

FIG. 15 is a flowchart showing an operation process during the migration execution according to the embodiment.

In FIG. 15, the migration source node or the migration destination node receives an operation from the host (S91). This operation is, for example, the I/O operation or a volume creation operation.

Next, the migration source node or the migration destination node determines whether or not the operation target holds the virtual ID (S92). When the operation target does not hold the virtual ID, the migration source node or the migration destination node performs an operation received from the host (S93).

On the other hand, when it is determined in S92 that the operation target holds the virtual ID, the migration source node or the migration destination node determines whether or not the operation target is in the migration (S94). When the operation target is not in the migration, the migration source node or the migration destination node proceeds to S93.

On the other hand, when it is determined in S94 that the operation target is in the migration, the migration source node or the migration destination node operates the migration source node (S95).

Next, the migration source node or the migration destination node determines whether or not the operation of the migration source node is successful (S96). When the operation of the migration source node is successful, the migration source node or the migration destination node operates the migration destination node (S97), and when the operation of the migration source node is failed, a failed response is returned to the host (S98).

Here, by allocating the same virtual ID to a logical resource of the migration target in the migration source node or the migration destination node, the user can operate the migration source node and the migration destination node in the same manner.

FIG. 16 is a flowchart showing a group creation process when the migration source volume and the storage container are deleted after the migration.

In FIG. 16, the migration processing unit 103 of FIG. 2 refers to the volume management table 105 of FIG. 8, and creates a list of virtual volumes associated with the protocol endpoint specified by the virtual machine 100 (S101).

Next, the migration processing unit 103 refers to the volume management table 105 in FIG. 8, and creates a list of storage containers used for creating the virtual volumes from the list of the virtual volumes created in S101 (S102).

Next, the migration processing unit 103 refers to the volume management table 105 of FIG. 8, acquires a list of virtual volumes created from the storage containers included in the list of the storage containers created in S102, and adds the list to the list of virtual volumes created in S101 (S103).

Next, the migration processing unit 103 updates the migration group management table 106 of FIG. 9 based on the list of virtual volumes created in S101, the list of storage containers created in S102, and the list of virtual volumes added in S103 (S104).

FIG. 17 is a flowchart showing a deletion process of the migration source volume and the storage container of FIG. 10.

In FIG. 17, the storage node 101 deletes the protocol endpoint, the virtual volume, and the storage container, which are migrated to the storage node 201, from the storage node 101 (S111 to S113).

The invention is not limited to the above-mentioned embodiments, and includes various modifications. For example, the above-mentioned embodiments have been described in detail for easy understanding of the invention, and are not necessarily limited to those including all the configurations described above. A part of configurations of an embodiment may be replaced with configurations of another embodiment, or the configurations of another embodiment may be added to the configurations of the embodiment. A part of the configuration of each embodiment may be added to, deleted from, or replaced with another configuration. A portion or all the configurations, functions, processing units, processing methods or the like described above may be implemented by hardware such as through design using an integrated circuit.

What is claimed is:

1. A storage system comprising:
a plurality of storages each having a processor, wherein
a migration group, in which a virtual volume, a first logical resource used to access the virtual volume, wherein the first logical resource is a protocol endpoint that manages access to the virtual volume, and a second logical resource used to create the virtual volume are grouped, is generated in a migration source storage, wherein the second logical resource is a storage container that cuts out the virtual volume, and
the migration group is migrated from the migration source storage to a migration destination storage, wherein the migration source storage is configured to
manage, as management information, a relationship between the virtual volume and the storage container, and a relationship between the protocol endpoint and the virtual volume, and
generate the migration group based on the management information on the relationships.

2. The storage system according to claim 1, wherein the migration source storage allocates a virtual ID, separately, to the protocol endpoint, the virtual volume, and the storage container.

3. The storage system according to claim 2, wherein
the migration destination storage allocates a second virtual ID to each of the protocol endpoint, the virtual volume, and the storage container which are migrated to the migration destination storage, the second virtual ID being the same as the virtual ID allocated by the migration source storage respectively.

4. The storage system according to claim 1, wherein
the migration source storage is configured to
start migration of a logical resource of the migration group based on an instruction from a host, and
return a response to the host when the migration of the logical resource of the migration group is completed.

5. The storage system according to claim 4, wherein
the migration source storage migrates the logical resource of the migration group to the migration destination storage without interposing the host between the migration source storage and the migration destination storage.

6. A storage system comprising:
a plurality of storages each having a processor, wherein
a migration group, in which a virtual volume, a first logical resource used to access the virtual volume, wherein the first logical resource is a protocol endpoint that manages access to the virtual volume, and a second logical resource used to create the virtual volume are grouped, is generated in a migration source storage, wherein the second logical resource is a storage container that cuts out the virtual volume, and
the migration group is migrated from the migration source storage to a migration destination storage, wherein
the migration destination storage configures, based on information of the migration group transmitted from the migration source storage:
a protocol endpoint that is the same as the protocol endpoint configured in the migration source storage,
a virtual volume that is the same as the virtual volume configured in the migration source storage, and
a storage container that is the same as the storage container configured in the migration source storage.

7. A storage system comprising:
a plurality of storages each having a processor, wherein
a migration group, in which a virtual volume, a first logical resource used to access the virtual volume, wherein the first logical resource is a protocol endpoint that manages access to the virtual volume, and a second logical resource used to create the virtual volume are grouped, is generated in a migration source storage, wherein the second logical resource is a storage container that cuts out the virtual volume, and the migration group is migrated from the migration source storage to a migration destination storage, wherein when a logical resource, to be migrated to the migration destination storage, is requested to be deleted from the migration source storage, the migration source storage also migrates a virtual volume, that is not a migration target and is associated with a storage container which is the migration target, to the migration destination storage.

8. A storage system comprising:

a plurality of storages each having a processor, wherein a migration group, in which a virtual volume, a first logical resource used to access the virtual volume, wherein the first logical resource is a protocol endpoint that manages access to the virtual volume, and a second logical resource used to create the virtual volume are grouped, is generated in a migration source storage, wherein the second logical resource is a storage container that cuts out the virtual volume, and the migration group is migrated from the migration source storage to a migration destination storage, wherein the migration source storage is further configured to show the protocol endpoint, the virtual volume, and the storage container to a host corresponding to the migration source storage, and when receiving, from the host, a migration request that specifies at least one of the protocol endpoint, the virtual volume, and the storage container, move the migration group, to which the at least one of the protocol endpoint, the virtual volume, and the storage container belongs to, according to the migration request.

* * * * *